(12) United States Patent
Collings et al.

(10) Patent No.: US 8,095,008 B2
(45) Date of Patent: Jan. 10, 2012

(54) SYSTEMS AND METHODS FOR A MULTIPLE-INPUT, MULTIPLE-OUTPUT CONTROLLER IN A RECONFIGURABLE OPTICAL NETWORK

(75) Inventors: Brandon C. Collings, Middletown, NJ (US); Douglas J. Beckett, Kanata (CA); Sanjay Choudhary, Elkridge, MD (US)

(73) Assignee: Ciena Corporation, Linthicum, MD (US)

( * ) Notice: Subject to any disclaimer, the term of this patent is extended or adjusted under 35 U.S.C. 154(b) by 699 days.

(21) Appl. No.: 11/789,572

(22) Filed: Apr. 25, 2007

(65) Prior Publication Data

US 2008/0267631 A1  Oct. 30, 2008

(51) Int. Cl.
*H04J 14/02* (2006.01)
(52) U.S. Cl. ............................... 398/83; 398/94; 398/95
(58) Field of Classification Search .............. 398/45–48, 398/83, 93–96
See application file for complete search history.

(56) References Cited

U.S. PATENT DOCUMENTS

| | | | |
|---|---|---|---|
| 7,139,120 B2* | 11/2006 | Sugiya | 359/341.42 |
| 7,359,112 B2* | 4/2008 | Nishihara et al. | 359/341.41 |
| 2002/0048066 A1* | 4/2002 | Antoniades et al. | 359/128 |
| 2002/0071627 A1* | 6/2002 | Smith et al. | 385/15 |
| 2002/0105695 A1* | 8/2002 | DeGrange et al. | 359/127 |
| 2009/0116841 A1* | 5/2009 | Yang et al. | 398/83 |

* cited by examiner

*Primary Examiner* — Dzung Tran
(74) *Attorney, Agent, or Firm* — Clements Bernard PLLC; Christopher L. Bernard; Lawrence A. Baratta, Jr.

(57) ABSTRACT

The present invention provides systems and methods to convert a reconfigurable optical node multiple-input multiple-output (MIMO) system to a single-input single-output (SISO) system suitable for a proportional-integral-differential (PID) control process. Advantageously, the present invention allows PID control to apply to a MIMO optical node by modeling the node as two SISO systems. The present invention optimizes the division of gain and loss between components in the reconfigurable optical node. This provides means to control the net gain and loss of a series of components when the component chain being controlled includes those components that have a single action affecting multiple channels and components that affect only one channel. The present invention utilizes control of a single quantity of amplifier gain minus attenuation for each channel, and the coupling together of all channels in the amplifier which makes the channels inter-dependent.

16 Claims, 13 Drawing Sheets

FIG. 1. _Prior Art_

SYSTEMS AND METHODS FOR A MULTIPLE-INPUT, MULTIPLE-OUTPUT CONTROLLER IN A RECONFIGURABLE OPTICAL NETWORK

CROSS-REFERENCE TO RELATED APPLICATION(S)

This application is a continuation-in-part of co-pending U.S. patent application Ser. No. 11/786,143, filed Apr. 10, 2007, and entitled "METHODS AND SYSTEMS TO STABILIZE AN OPTICAL NETWORK AGAINST NODAL GAIN CHANGES," the contents of which are incorporated in full by reference herein.

FIELD OF THE INVENTION

The present invention relates generally to optical networks. More specifically, the present invention relates to systems and methods for a multiple-input, multiple-output (MIMO) controller which converts a MIMO reconfigurable optical node to a single-input, single-output (SISO) system suitable for a proportional-integral-differential (PID) control process to control optical amplifier gain and per-channel attenuation settings.

BACKGROUND OF THE INVENTION

Fiber-optic transmission networks provide transmission for multiple channels using wavelength division multiplexing (WDM). Optical amplifiers, such as erbium-doped fiber amplifiers (EDFAs), provide a mechanism for boosting power after the multiple channels are attenuated due to fiber loss from being transmitted over a distance. Additionally, fiber-optic transmission networks can include other components, such as variable optical attenuators (VOAs), wavelength selective switches (WSSs), wavelength blockers, and the like, which in addition to other functionality can adjust per-channel power (or per group of channels).

Referring to FIG. 1, an exemplary reconfigurable optical network 10 is illustrated showing a single transmission path. Fiber-optic networks typically include both a transmit and receive path for bidirectional communication, but FIG. 1 depicts only a unidirectional path for simpler illustration purposes. Topologies of fiber-optic transmission networks include ring, linear, mesh, and combinations thereof. FIG. 1 illustrates a ring topology with a linear spur through a reconfigurable optical add-drop multiplexer (ROADM) 30. The network 10 is shown with four nodes 20 each including a pre-amplifier 22 located at the input to the nodes 20 and a post-amplifier 28 located at the output of the nodes 20. The pre-amplifier 22 provides optical amplification prior to de-multiplexing of channels (i.e., wavelengths), and the post-amplifier 28 provides optical amplification after multiplexing of channels prior to transmission on a fiber 14.

Each of the nodes 20 illustrated in FIG. 1 include a mid-stage point between the pre- and post-amplifiers 22,28 including a fixed optical add-drop multiplexer (OADM) 24, a variable optical attenuator (VOA) 26, and the ROADM 30. Each of the components 24,26,30 is capable of providing per-channel or per group of channel attenuation on wavelengths that are added, dropped, or expressed through the node. The OADM 24 provides for adding and dropping of fixed wavelengths, and the ROADM 30 provides for reconfigurable add/drop of any wavelength. ROADMs 30 can include a microelectromechanical system (MEMS)-based wavelength-selective switch (WSS), a wavelength blocker, a multiplexer, and the like.

Each node 20 in the reconfigurable optical network 10 simultaneously receives optical channels from other nodes 20 over the optical fiber 14. The optical paths of the optically-multiplexed received channels may either be terminated ("dropped") at the current node 20 with the ROADM 30 or OADM 24, or switched to continue on to other nodes ("expressed") over additional optical fiber connections with the ROADM 30, OADM 24, or VOA 26. Such path routing may be accomplished by a number of technologies, including the WSS. The WSS provides adjustment of the individual channel attenuations, so that, for example, power equalization may be effected. When combined with the wideband optical amplifiers 22,28 at the node 20, the WSS also contributes to control of the net gains for each individual channel at the node. The optical amplifier 22,28, through a single gain setting, affects all of the channels at once.

The stability and setting accuracy of optical powers within reconfigurable optical networks 10 is a universal goal of equipment providers and network operators. The amplifiers 22,28 and components 24,26,30 each are adjusted to account for different power levels based on a variety of factors, such as channel count. A common obstacle in meeting the stability and setting accuracy goal is the change that occurs in optical gain for channels that are active after a system event. Such an event can include unplanned (e.g., through equipment failure or fiber cut) or planned (e.g., addition or deletion of channels) changes in the number of channels passing through the amplifiers.

Optical power-control-loops are designed to counter individual or collective power changes and to converge signal powers (collectively and individually) to target values. For example, these optical power-control-loops are configured to dynamically provide attenuation to individual channels through the various components 24,26,30, and to adjust the overall gain of the amplifiers 22,28. The speed of convergence of signal powers to targets is higher when the express-channel node-gain is controlled independently of channel output-power. An example of such power-control-loops is described in commonly-assigned U.S. patent application Ser. No. 11/786,143, filed Apr. 10, 2007, and entitled "METHODS AND SYSTEMS TO STABILIZE AN OPTICAL NETWORK AGAINST NODAL GAIN CHANGES."

Amplifiers 22,28 and per-channel attenuation devices have defined limits to their operating gains and losses. Furthermore, optimal signal-to-noise ratio (OSNR) depends on the relative settings of amplifier 22,28 gain, which affects all channels together, and per-channel attenuation, which affects channels individually. For example, in the case where optical amplification occurs before a WSS, ideal channel performance is obtained when the amplifiers are operated at the highest gain possible.

Currently, methods independently control amplifiers 22,28 to gain or power targets, and set per-channel attenuations to achieve separately-determined attenuation targets for individual channels. Alternatively, current methods rapidly determine that limits have been reached on attenuation or amplifier control, and use a slower, external, control process (control loop) to optimally determine the division between amplifier gain and per-channel attenuation loss.

Ideally, a single controller would be used to control both amplifier gain and attenuation. In addition, the use of an industry-standard proportional-integral-differential (PID) control process is desirable. However, PID control is not typically applicable to multiple-input multiple-output (MIMO) systems. The nodes 20 in the reconfigurable optical network 10 are MIMO systems with the multiple inputs and outputs including the channels dropped and expressed through the node 20.

Separate control of amplifier and attenuation settings makes it difficult to maximize signal-to-noise ratio. Use of a separate control loop to arbitrate between amplifier gain and per-channel attenuation must be at least ten times slower than the amplifier and WSS control loops in order to maintain process stability. This results in longer periods of time when non-optimal signal-to-noise ratio is in effect.

Referring to FIG. 2, a proportional-integral-derivative controller (PID controller) 40 is a common feedback loop component in control systems. The PID controller 40 takes a measured value from a process or other apparatus and compares it with a reference setpoint value (i.e., summation block 41). The difference (or "error" signal) is then used to adjust some input to the process in order to bring the process' measured value to its desired setpoint. Unlike simpler controllers, the PID can adjust process outputs based on the history and rate of change of the error signal, which gives more accurate and stable control. In contrast to more complex algorithms such as optimal control theory, PID controllers 40 can often be adjusted without advanced mathematics. For example, the PID controller 40 can be implemented quickly and efficiently in a microprocessor or a digital signal processor (DSP).

The PID controller 40 includes three terms including a proportional term 42, an integral term 43, and a derivative term 44. The error signal from the summation block 41 is input to each of the terms 42,43,44. The proportional term 42 handles the immediate error, the error is multiplied by a constant $K_p$. Note that when the error is zero, the proportional term 42 is zero. The constant $K_p$ is the proportional gain and the larger $K_p$ typically means faster response since the larger the error, the larger the feedback to compensate. The integral term 42 enables the controller 40 to learn from the past by integrating the error and multiplying by a constant $K_i$. The integral term 42 allows the controller 40 to eliminate a steady state error if the process requires a non-zero input to produce the desired setpoint.

The integral term 42 will react to the error by accumulating a value that is added to the output value. While this will force the controller to approach the setpoint quicker than the proportional term 42 alone and eliminate steady state error, it also guarantees that the process will overshoot the setpoint since the integral value will continue to be added to the output value. The constant $K_i$ is the integral time and the smaller $K_i$ implies steady state errors are eliminated quicker with the tradeoff being a larger overshoot, i.e. any negative error integrated during transient response must be integrated away by positive error before we reach steady state.

The derivative term 44 allows the controller 40 to anticipate the future by taking the first derivative of the error and multiplying it by a constant $K_d$. This can be used to reduce the magnitude of the overshoot produced by the integral component, but the controller will be a bit slower to reach the setpoint initially. The constant $K_d$ is the derivative time with a larger $K_d$ decreasing overshoot, but slowing down transient response. There are several tuning algorithms for the PID controller which set the constant values.

Disadvantageously, MIMO systems are complex to control and PID control cannot be applied to a reconfigurable optical node because it is a MIMO system.

BRIEF SUMMARY OF THE INVENTION

In various exemplary embodiments, the present invention provides systems and methods to convert a reconfigurable optical node multiple-input multiple-output (MIMO) system to a single-input single-output (SISO) system suitable for a proportional-integral-differential (PID) control process. Advantageously, the present invention allows PID control to apply to a MIMO optical node by modeling the node as two SISO systems. The present invention optimizes the division of gain and loss between components in the reconfigurable optical node. This provides means to control the net gain and loss of a series of components when the component chain being controlled includes those components that have a single action affecting multiple channels and components that affect only one channel. The present invention utilizes control of a single quantity of amplifier gain minus attenuation for each channel, and the coupling together of all channels in the amplifier which makes the channels inter-dependent.

The present invention exploits the range limits of the gain and loss components to separate the control into two SISO domains: one for all channels in the amplifier, and one for each channel attenuation (e.g. through a WSS, VOA, or the like). In an exemplary embodiment, amplifier gain is increased until at least one channel attenuation is at its maximum. When the amplifier is at either maximum or minimum gain, then a PID control acts independently and in parallel with a SISO for each channel where the attenuation has not also reached its limit. When at least one, but not necessarily all, of the channels is at maximum attenuation limit, then the PID control acts continuously with a SISO on the amplifier gain and independently and in parallel with the SISO for each channel's attenuation that has not reached its limit. Finally, when no channel is at or above its maximum attenuation limit, the amplifier gain is increased by the difference between the channel nearest to its limit and that limit. Advantageously, the present invention provides rapid, optimized, settings of concatenated amplifier gain and attenuation through a single controller. Simultaneous control of chained optical components in a single PID control-loop is achieved. This make a more rapid controller, which is commercially attractive, without resorting to more complex control schemes, which would be costly and have risk of instability.

In an exemplary embodiment of the present invention, a method for controlling optical amplifier gain and per-channel attenuation in a multiple-input, multiple-output reconfigurable optical node includes managing per-channel attenuation for each of a plurality of channels in the node, and managing optical amplifier gain responsive to the managing per-channel attenuation step. The multiple-input, multiple-output reconfigurable optical node includes a reconfigurable optical add-drop multiplexer, and the per-channel attenuation is performed by a wavelength selective switch. The managing per-channel attenuation step includes comparing a drop power target to actual channel drop power for each of the plurality of channels that is dropped at the node, comparing an express node gain target to actual express node gain for each of the plurality of channels that is expressed through the node, and updating per-channel attenuation for each of the plurality of channels responsive to the comparing steps. The express node gain target is determined by comparing egress power out actual of each of the express channels of the plurality of channels to a target value. A proportional-integral-differential control process is used in the comparing steps. The managing optical amplifier gain step includes adjusting optical amplifier gain by the difference between a channel of the plurality of channels which is closest to a maximum attenuation setting and the maximum attenuation setting.

In another exemplary embodiment of the present invention, an optical amplifier gain and per-channel attenuation control method for separating control of a multiple-input, multiple-output reconfigurable optical node into two single-input, single output domains includes implementing an outer control loop on a plurality of channels expressing through the node to determine a target node gain, and implementing an inner control loop on all channels utilizing the target node gain on the plurality of channels expressing through the node and a drop power target on a plurality of channels dropping at the node, wherein the inner control loop is configured to control optical amplifier gain and per-channel attenuation for the plurality of channels expressing through the node and a the plurality of channels dropping at the node. The outer and inner loop separate the multiple-input, multiple-output reconfigurable optical node into two single-input, single output domains including a per-channel attenuation domain and an optical amplifier gain domain. The outer and inner loops each utilize a proportional-integral-differential control process. The proportional-integral-differential control process is used to determine the target node gain and to determine the optical amplifier gain. The multiple-input, multiple-output reconfigurable optical node includes a reconfigurable optical add-drop multiplexer, and the per-channel attenuation is performed by a wavelength selective switch.

In yet another exemplary embodiment of the present invention, a multiple-input, multiple-output reconfigurable optical node includes an optical amplifier, means for per-channel attenuation of a plurality of channels expressing through the node and dropping at the node, means for per-channel power measurement of the plurality of channels expressing through the node and dropping at the node, and a node controller in communication with the optical amplifier, per-channel attenuation means, and per-channel power measurement means. The node controller is configured to manage the per-channel attenuation means per-channel attenuation for each of a plurality of channels in the node, and manage the optical amplifier gain responsive to the per-channel attenuation means. The controller manages the per-channel attenuation means by comparing a drop power target to actual channel drop power for each of the plurality of channels dropping at the node, comparing an express node gain target to actual express node gain for each of the plurality of channels expressing through the node, and updating per-channel attenuation for each of the plurality of channels responsive to the comparing steps. The express node gain target is determined by comparing egress power out actual of each of the plurality of channels expressing through the node to a target value. A proportional-integral-differential control process is used in the comparing steps. The controller manages the optical amplifier gain by adjusting optical amplifier gain by the difference between a channel of the plurality of channels which is closest to a maximum attenuation setting and the maximum attenuation setting.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods to convert a reconfigurable optical node multiple-input multiple-output (MIMO) system to a single-input single-output (SISO) system suitable for a proportional-integral-differential (PID) control process. Advantageously, the present invention allows PID control to apply to a MIMO optical node by modeling the node as two SISO systems. The present invention optimizes the division of gain and loss between components in the reconfigurable optical node. This provides means to control the net gain and loss of a series of components when the component chain being controlled includes those components that have a single action affecting multiple channels and components that affect only one channel. The present invention utilizes control of a single quantity of amplifier gain minus attenuation for each channel, and the coupling together of all channels in the amplifier which makes the channels inter-dependent.

The present invention exploits the range limits of the gain and loss components to separate the control into two SISO domains: one for all channels in the amplifier, and one for each channel attenuation (e.g. through a WSS, VOA, or the like). In an exemplary embodiment, amplifier gain is increased until at least one channel attenuation is at its maximum. When the amplifier is at either maximum or minimum gain, then a PID control acts independently and in parallel with a SISO for each channel where the attenuation has not also reached its limit. When at least one, but not necessarily all, of the channels is at maximum attenuation limit, then the PID control acts continuously with a SISO on the amplifier gain and independently and in parallel with the SISO for each channel's attenuation that has not reach its limit. Finally, when no channel is at or above its maximum attenuation limit, the amplifier gain is increased by the difference between the channel nearest to its limit and that limit. Advantageously, the present invention provides rapid, optimized, settings of concatenated amplifier gain and attenuation through a single controller. Simultaneous control of chained optical components in a single PID control-loop is achieved. This make a more rapid controller, which is commercially attractive, without resorting to more complex control schemes, which would be costly and have risk of instability.

Figure 1:
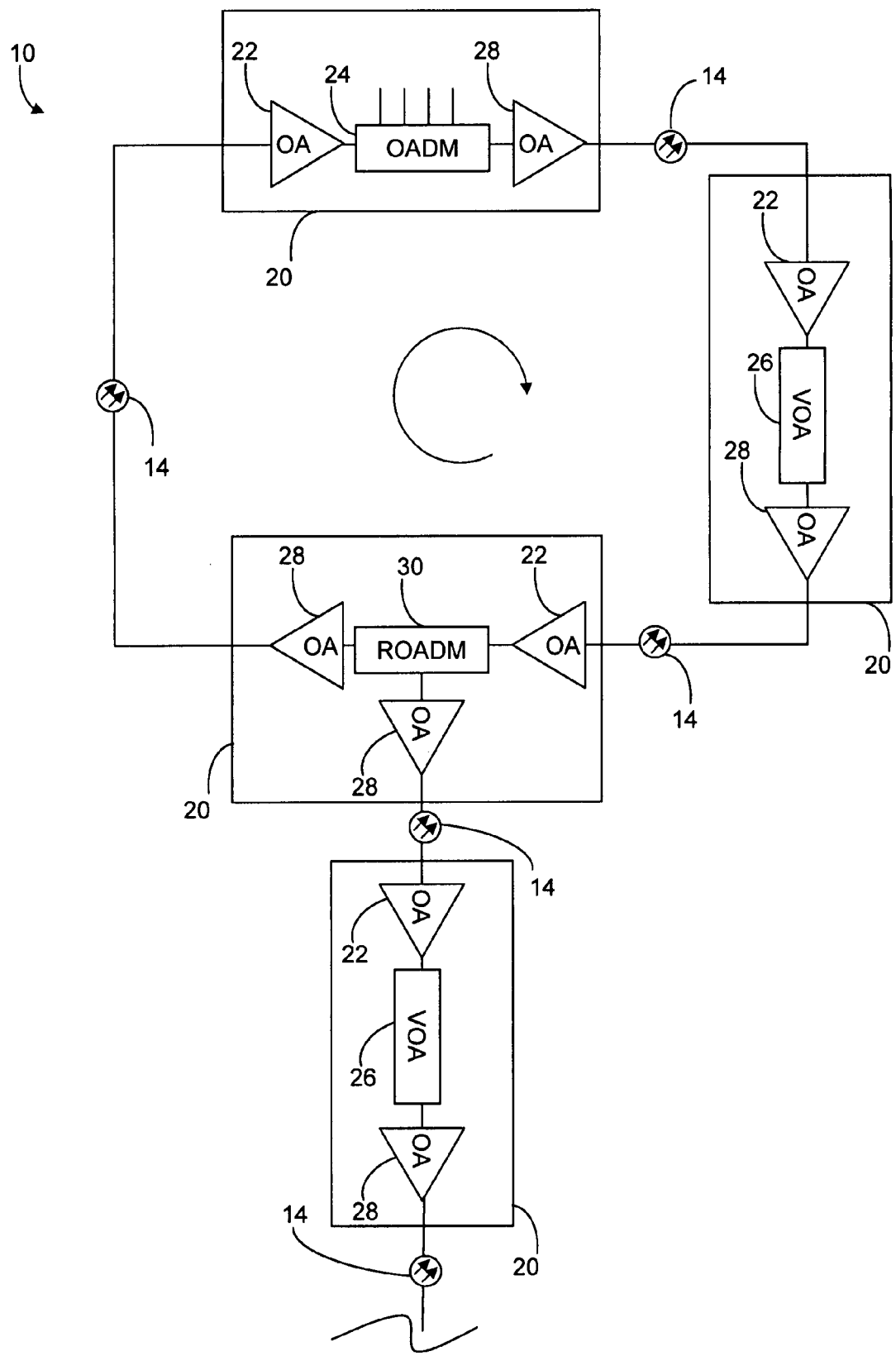
FIG. 1 is an exemplary fiber-optic network.
Figure 2:
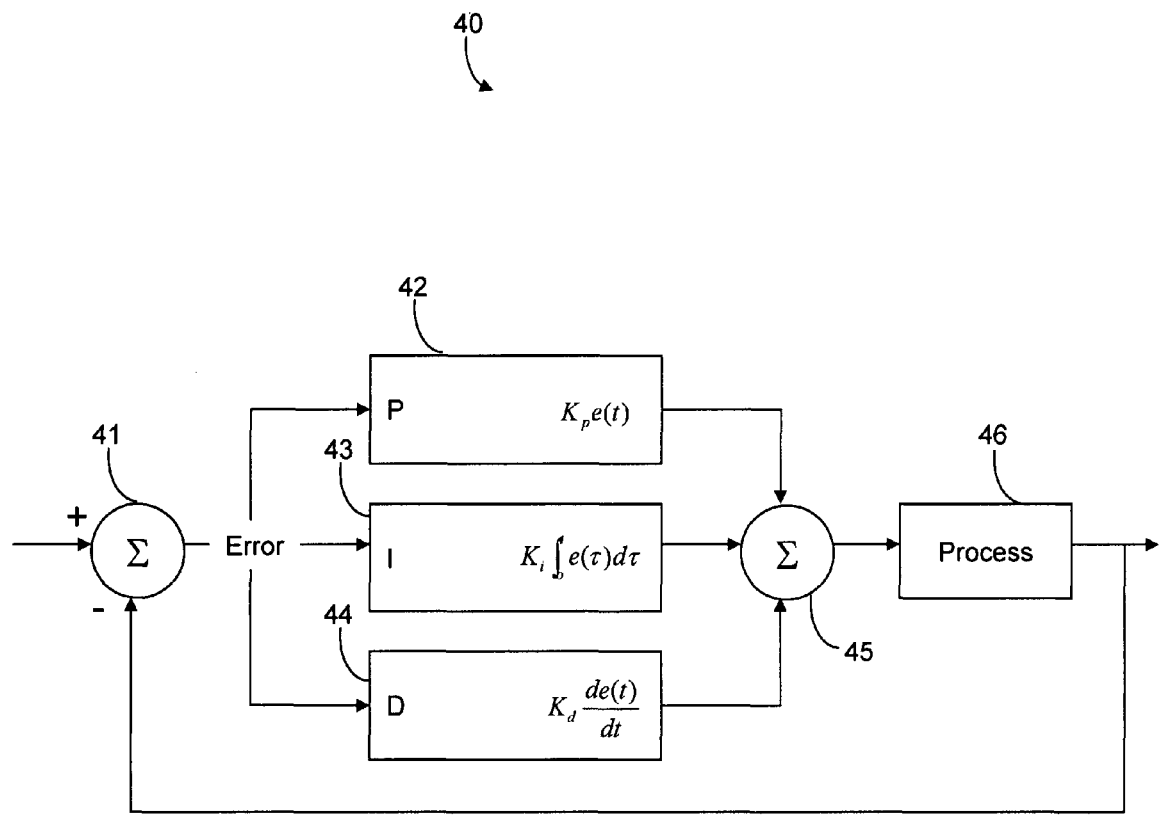
FIG. 2 is a block diagram of a proportional-integral-differential (PID) control process.
Figure 3:
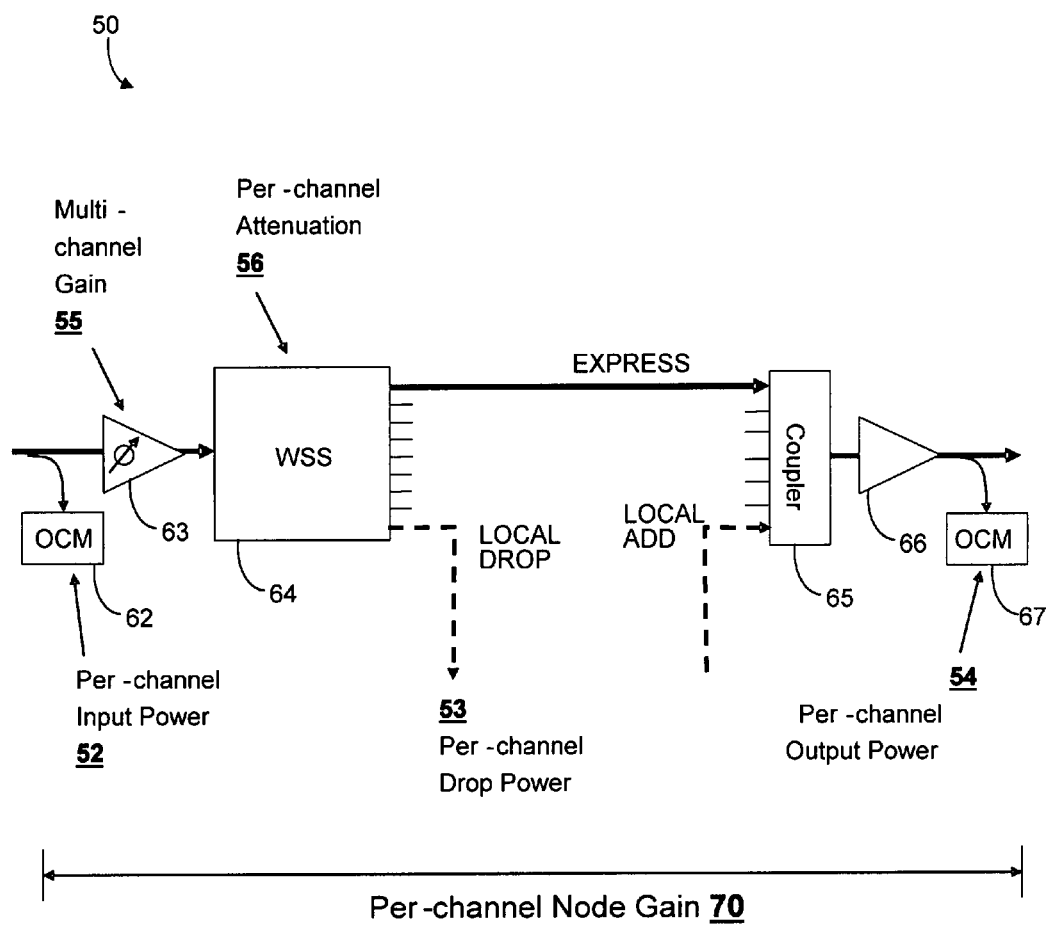
FIG. 3 is a block diagram of a reconfigurable optical node illustrating power, gain, and attenuation according to an exemplary embodiment of the present invention.

Referring to FIG. 3, a block diagram illustrates a reconfigurable optical node 50 according to an exemplary embodiment of the present invention. The optical node 50 includes an optical channel monitor (OCM) 62,67 configured to provide per-channel optical power at the ingress and egress of the node 50, an optical pre-amplifier 63, a wavelength selective switch (WSS) 64, a coupler 65, and an optical post-amplifier 66. The OCM 62,67 generally includes photodetectors (PD) configured to non-intrusively measure optical power, such as per-channel input power 52 and per-channel output power 54 periodically for each channel. The amplifiers 63,66 can include erbium-doped fiber amplifiers (EDFAs), semiconductor optical amplifiers (SOAs), Raman amplifiers (RAs), and the like. The amplifiers 63,66 are configured to amplify multiple channels (i.e. wavelengths), and a multi-channel gain 55 of the amplifiers 63,66 is a configurable parameter.

Generally, the WSS 64 and coupler 65 form a reconfigurable optical add-drop multiplexer (ROADM) which is capable of remotely adding and dropping channels. For example, the WSS 64 can include a wavelength switching device, such as a Micro-electro-mechanical System (MEMS) mirror, which can drop (e.g. terminate locally) or express any of the incoming channels. The locally drop channels each have a per-channel drop power 53. The coupler 65 can include a wavelength multiplexer device configured to add channels. The WSS 64 is capable of providing configurable per-channel attenuation 56. The systems and methods of the present invention also can be used with other devices in the mid-stage between the amplifiers 63,66 which can provide per-channel attenuation 56, such as fixed optical add-drop multiplexers (OADM), tunable variable optical attenuators (VOAs), and any other component configured to provide per-channel tunable attenuation.

For illustration purposes the node 50 depicts a unidirectional path, and those of ordinary skill in the art will understand that the node 50 also typically includes a second fiber in the opposite direction with the same components to enable a bi-directional path. Also, the node 50 depicts a two-degree ROADM system, and those of ordinary skill in the art will understand that a multiple-degree ROADM system can be formed by adding additional components.

The present invention utilizes automatic channel power control algorithms to automatically manage optical power levels per-channel by utilizing the high-speed channel power measurement capability of the OCMs 62,67 and a communication infrastructure between the various components. This power management consists of automatic adaptation of incoming channel power levels to the appropriate level within the system, periodic and automatic power level equalization during transmission, and a provisionable de-multiplexed output power level. This automatic power level control operates autonomously at the module level without requiring power level input from the user, either during network installation, operation, or alteration.

Advantageously, channel power level equalization and pre-emphasis compensates undesired channel power excursions created by amplifier gain ripple, filtering, spectrally dependent fiber loss, and channel-to-channel Raman pumping. This equalization enables extension of the system reach by preventing channel powers from either decreasing, and suffering increased optical signal-to-noise ratio (OSNR) degradation, or increasing and incurring increased nonlinear penalties.

In general, the automatic channel power control algorithms are designed to function primarily within the boundaries of a single node 50. Therefore, all OCM 62,67 channel power measurement information, computation and determination of any power control actions that should be implemented, other than those of Pre-Emphasis, and the implementation of those actions are all preformed on equipment within the given node 50. This approach has several advantages including limiting control information distribution to within the node 50, increasing the reliability of the power control algorithms and decreasing control plane complexity and bandwidth requirements.

The automatic channel power control algorithms are implemented through nested control loops, each designed to independently maintain a respective parameter of each channel power. A Constant Node Gain (CNG) control loop maintains constant relative difference between the channel input power 52 and the channel output power 54. This ensures that internal changes within the node 50 will also be corrected at the same node 50. The CNG loop can also control the constant optical power 53 delivered to the local-drop receivers. A second nested control loop, the constant output power (COP) loop, brings the node output power (launch power) to a target value by setting the CNG targets for express channels and add-channel attenuation. Optionally, a third nested control loop, the channel power pre-emphasis (PE), can be utilized to change target values in the COP loop to ensure equal OSNR performance over a link.

Each channel that is considered to be provisioned and active entering a particular degree of the node 50 and exiting any other degree is controlled through an independent power control algorithm including the three loops listed above. Therefore, per-channel power control is achieved within the node 50 independent of the number of degrees present or how the channels are meshed between degrees. Also, the control algorithms are constructed identically for conventional two-degree nodes as they are for eight-degree, fully meshed nodes. The same per-channel power control algorithms also function similarly to control the channel power of locally added and dropped channels.

The goal of the CNG control loop is to maintain a target amount of gain through the node 50 for each channel for each ROADM degree, or group of channels for each OADM degrees. The node gain is computed as the difference in dB between the respective channel power at the output from the node and the input to the node. The outputs of the CNG loop are a desired amount of gain 55 for the respective OA amplifier, as well as the attenuation setting 56 for each channel provisioned. Note that the gain 55 of the OA and the per-channel attenuation 56 both act to affect the power of each given channel or channel group. A ROADM module can affect the attenuation levels of all channels independently in both the drop and express directions. A fixed OADM module typically can only affect the attenuation levels of groups of channels independently in both the drop and express directions. Also, typically both the ROADM and OADM modules independently affect the channel powers of added channels. The gain 55 of the OA affects the power levels of all channels effectively equally. Therefore, the power of a channel can be increased by either increasing/decreasing the gain 55 of the OA or by decreasing/increasing the current respective attenuation setting 56 of that channel in the ROADM module or that channel group in the OADM module.

Similarly, the COP drop portion of the algorithm controls both ROADM or OADM attenuation 56 and OA gain 55 for drop channels. Since all the channels cannot individually set one OA (e.g. a wavelength-division multiplexed system can input hundreds of channels), the OA gain 55 is determined by that channel which is closest to the maximum attenuation permitted on the ROADM, OADM, or VOA providing the per-channel attenuation 56. In the ROADM case, this maximum power is different for express and drop channels (currently 8 and 15 dB, respectively). In the OADM and VOA case, the maximum attenuation is simply the VOA limit on the device.

In one exemplary embodiment, the OCMs 62,67 are distributing the measured input optical powers 52 of each channel in the in the inbound (Rx) direction every 55 ms. Similarly, the measure output powers 54 of each of the channels in the outbound (Tx) direction every 55 ms, sequentially offset from the Rx power measurements by ~7 ms. The ROADM module (e.g. the ROADM includes the WSS 64 and coupler 65 in one module) receives the individual channel power measurements for the channels in the Rx direction as these are the channels passing through the ROADM module. The ROADM also receives the channel power measurements for the Tx direction from the OCM 67 modules of all degrees in which that ROADM routes a channel. Effectively, an independent CNG Loop is operating for each channel provisioned through the ROADM.

The node gain 70 of each channel is simply the difference in dB of the measured channel output to input powers. In one embodiment, the relative timing of the Rx and Tx OCM 62,67 channel power measurements is not controlled or synchronized. As the time needed for the optical signal to propagate between Tx and Rx OCMs is less than 30 μs and edge transients of <1 ms must be considered, any pair of Tx and RX OCM 62,67 measurements may not be sampling the same point in time of the optical signal. As the difference of the Rx and Tx OCM 62,67 powers will provide the feedback to the CNG loop, Tx and Rx OCM 62,67 measurements which occur on either side of a transient change in the channel power incident on the node will result in an incorrect measurement of the current node gain for that channel. Therefore, averages are taken of the OCM 62,67 measurements. Alternatively, the OCMs 62,67 can be synchronized to provide measurements at the same time period.

There are a number of boundary conditions in which this loop operates which impact how the algorithms is designed. The ROADM (WSS 64) attenuation setting limited to 0-8 dB for express channels and 0-15 dB for drop channels (measured from insertion loss at 0 dB attenuation setting). The 8 dB limit is present to avoid significant "dog ears" in channel passband that may occur due the WSS 64. Additionally, OA gain range limitations and noise figure (NF) implications, OA output power limitation, and non-linear limitations on the channel power launched into a dispersion compensating module (DCM) module at mid-stage of the OA are also considered.

In order to maximize system performance and minimize the NF of each channel through the amplifiers 63,67, the loop attempts to maximize the OA gain 55 which has the effect of minimizing the effective NF. Typically, the result of maximizing the OA gain 55 will have the effect of increasing the per-channel attenuation 56 levels. However, the limited OA gain 55, OA output power, the limited channel attenuation 56 or the limited amount of power that can be launched into a DCM module located at the mid-stage of the OA (if present) provide a limit to how high the gain 55 of the OA can be increased.

The Constant Output Power (COP) loop functions as an outer loop to the CNG loop for express channels, and as a standalone power control loop for add channels. The express channel power target is achieved by changing a node gain target for the CNG loops, while the add channel power target is achieved by setting per-channel attenuations on input ports. The CNG control loop corrects the gain error by adjusting amplifier gain 55 and the per-channel attenuation 56. In the present invention, the CNG loop utilizes PID control to compare a target gain generated by the COP loop against a current node gain 70 and feeds the gain error into a PID controller.

The COP loop fulfills channel power setting or equalization requirements. However, the COP loop, running on multiple nodes in series, will over-react to upstream transients and cause system oscillations unless a faster node gain loop is used to keep nodes insulated from external events. The COP loop sets the node gain loop per-channel-node-gain targets, and effects output power targets via the node gain loop. As described herein, the CNG loop maintains constant relative difference (in dB) between the channel power at the node input 52 and the node output 54. This ensures that internal changes within the node will also be corrected at the same node. The node gain loop utilizes the OCMs 62,67 to monitor per-channel power at the input and output, and utilizes a synchronized or averaged reading over time to measure node gain for each channel. This measured node gain is compared to a target node gain for each channel (which is set by the COP loop). Accordingly, per-channel attenuation 56 and multi-channel gain 55 are adjusted responsive to the measured node gain comparison to the target node gain. Also, the CNG loop can control constant optical power 53 delivered to the local-drop data-cards.

The COP loop brings the node output power (launch power) to a target value by setting the node gain targets for express channels and add-drop channel attenuation. A pre-emphasis loop can change the constant output loop targets to ensure equal OSNR performance over a link. The pre-emphasis loop is optional.

Figure 4:
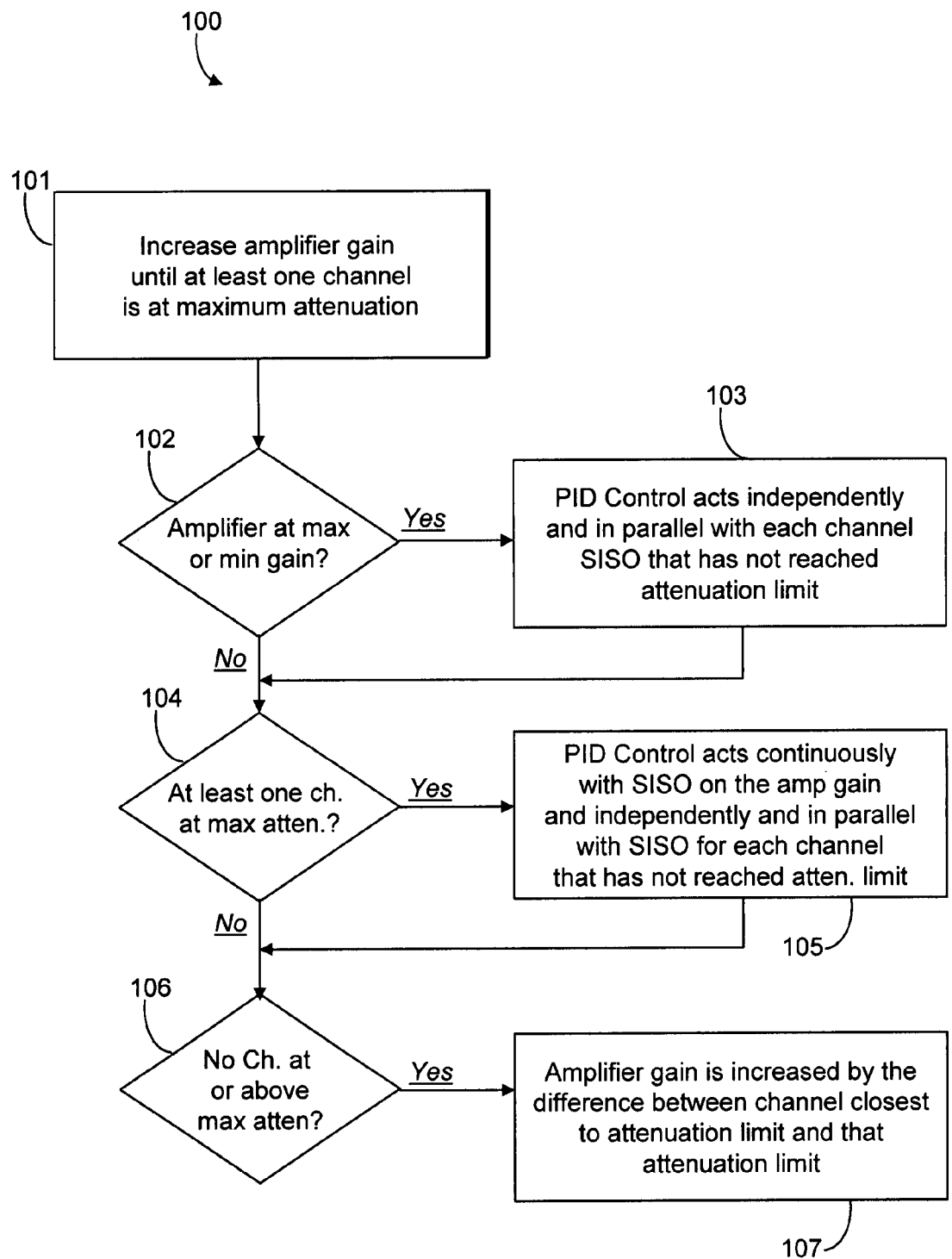
FIG. 4 is a flowchart illustrating an exemplary embodiment of the present invention to separate control of a MIMO reconfigurable optical node into two SISO domains, one for all channels, and one for the attenuation of each channel.

Referring to FIG. 4, a flowchart 100 illustrates an exemplary embodiment of the present invention to separate control of a MIMO reconfigurable optical node into two SISO domains, one for all channels, and one for the attenuation of each channel. Amplifier gain is increased until at least one of the multiple channels through the amplifier is at its maximum attenuation value (step 101). Here, maximum attenuation means the per-channel attenuation, such as from a WSS, VOA, etc., is set at the maximum limit. If the amplifier is at either maximum or minimum gain (step 102), then PID control acts independently and in parallel with a SISO control for each channel's attenuation that has not also reached its limit (step 103). If at least one channel is at its maximum attenuation limit (step 104), then PID control acts continuously with a SISO control for the amplifier gain, and independently in parallel with the SISO control for each channel's attenuation (step 105). If no channel's attenuation is at or above its maximum limit (step 106), then the amplifier gain is increased by the difference between the channel nearest to its attenuation limit and that attenuation limit (step 107).

Referring to FIGS. 5-8, flowcharts implementing the nested control loops (i.e. CNG and COP loops) are illustrated according to an exemplary embodiment of the present invention. As described herein, the nested control loop operates between components such as optical amplifiers (OAs), OCMs, ROADMs, OADMs, and the like. The flowchart illustrated in FIGS. 5-7 can be implemented in a digital signal processor (DSP), microprocessor, or the like contained in one or more of the components, and in communication with the other components, such as through a backplane, control plane, or the like.

The flowchart initializes and keeps a loop count which is incremented after each iteration of the loop (step 200). If the control loops are disabled or on hold (step 201), then the loop terminates back at step 200. Next, the flowchart checks to see if it is time to run a constant output power (COP) loop 210 (step 202). The COP loop 210 calculates target gain for the node based on the differences between the current powers of the express channels and the target powers of the express channels. The COP loop 210 is run periodically, such as every $5^{th}$ or $10^{th}$ iteration of the loop count. The output of the COP loop 210 is an updated target node gain which is utilized in an inner, faster loop for channel node gain (CNG).

Figure 6:
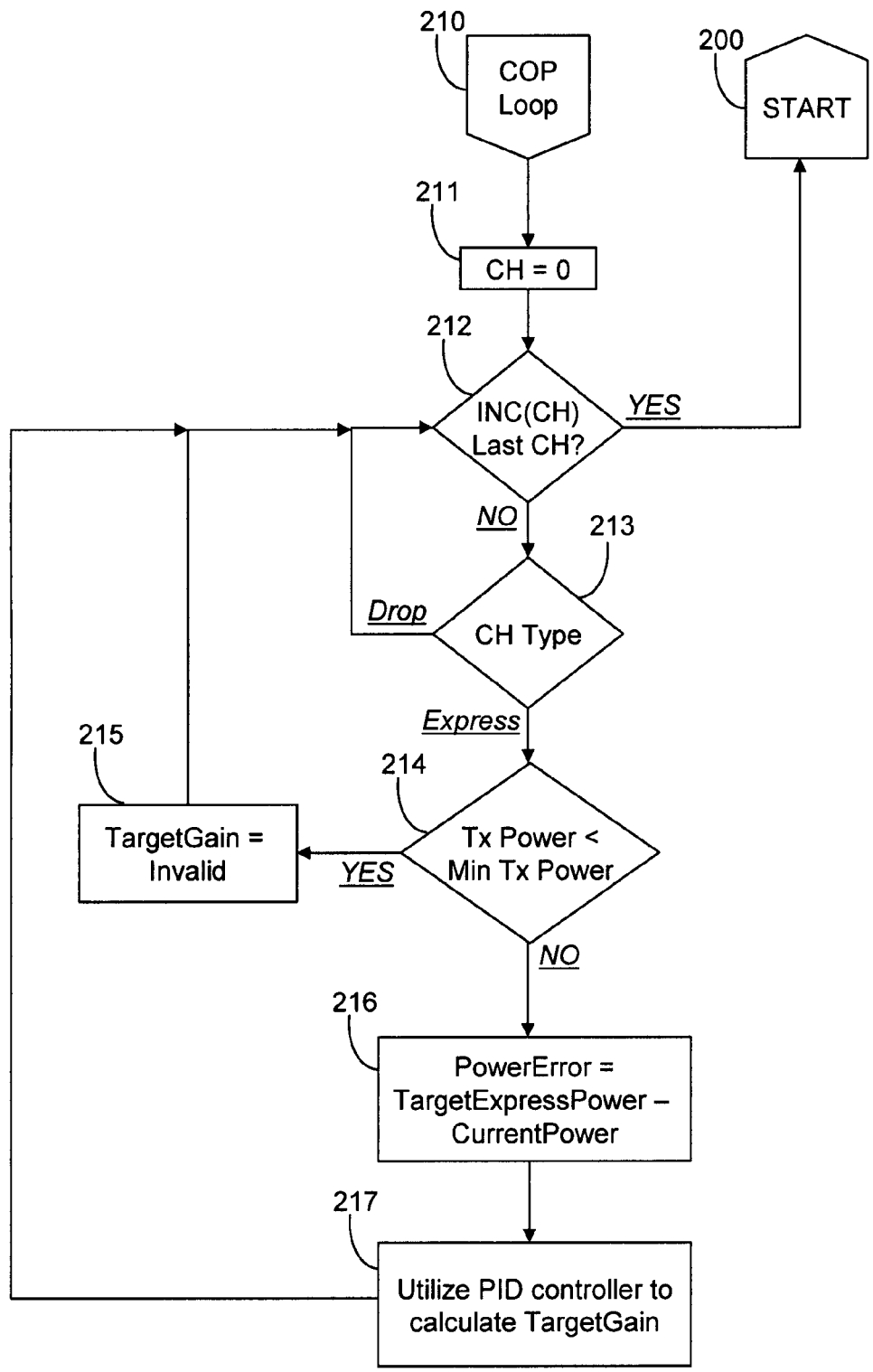
FIG. 6 is a second flowchart illustrating a constant output power control loop according to an exemplary embodiment of the present invention.

FIG. 6 illustrates the COP loop 210. First, a channel count is initialized at 0 (step 211). Next, the channel count is incremented and checked to see if the channel count equals the last channel (step 212). If the channel count equals the last channel, then the COP loop 210 is complete and it goes back to step 200. Next, the channel type of the channel number equal to the channel count is checked (step 213). If the channel type is a dropped channel, then this is ignored by the COP loop and the loop returns to step 212. If the channel is express, then the Tx power of this channel is compared to a minimum Tx power (step 214). If it is less than the minimum Tx power, then the TargetGain for that channel is invalid (step 215), and the COP loop returns to step 212. If not, then PowerError is calculated for this channel as the difference between a TargetExpressPower from the CurrentPower (i.e. result of a power measurement in step 231).

A proportional-integral-derivative (PID) controller is utilized to calculate TargetGain (step 217). TargetGain is calculated as the sum of the $P_{contrib}$, $I_{contrib}$, and $D_{contrib}$ terms from the PID algorithm. These terms are calculated based upon PowerError from each express channel, and different fixed gain constants. Once the COP loop increments through all channels, TargetGain is calculated from the PID controller, and this is passed back to the CNG loop.

Figure 5:
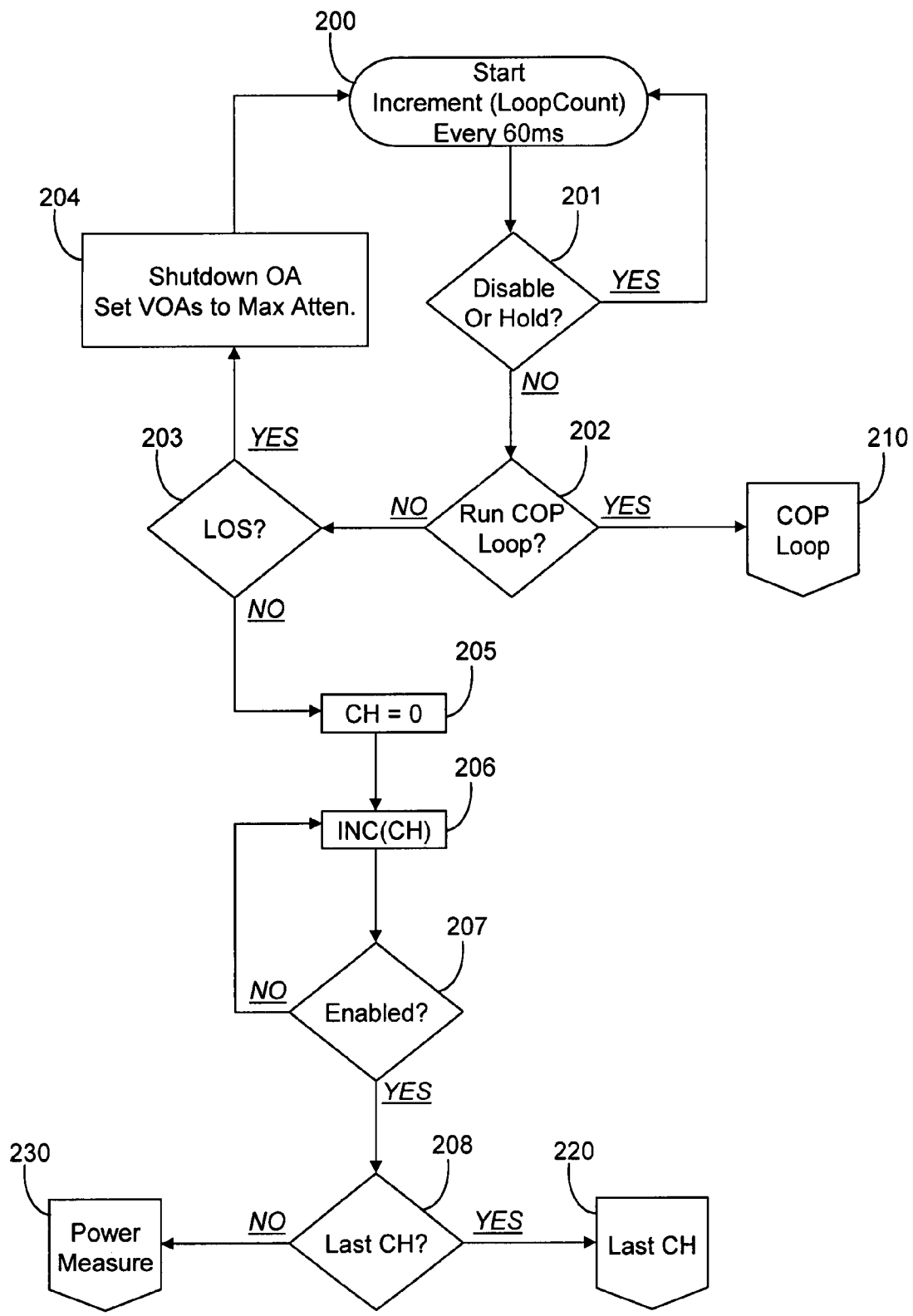
FIG. 5 is a first flowchart illustrating nested control loops according to an exemplary embodiment of the present invention.

Back in FIG. 5, if the COP loop is not run in step 202, then the loop checks to see if there is a loss-of-signal (LOS) condition (step 203). If the node has LOS, then the OAs are shutdown and VOAs are set to maximum attenuation (step 204) and the loop returns to step 200. If no LOS, then the CNG loop begins by setting a channel count increment to 0 (step 206). Next, the channel count is incremented (step 206). The channel is checked to see if it is enabled at the node (step 207) and, if not, then the loop goes to step 206. If so, the loop checks to see if it is the last channel (step 208). If it is not the last channel, then the CNG loop goes to power measurement (step 230) and, if it is the last channel, then the CNG loop goes to a last channel flowchart (step 220).

Figure 7:
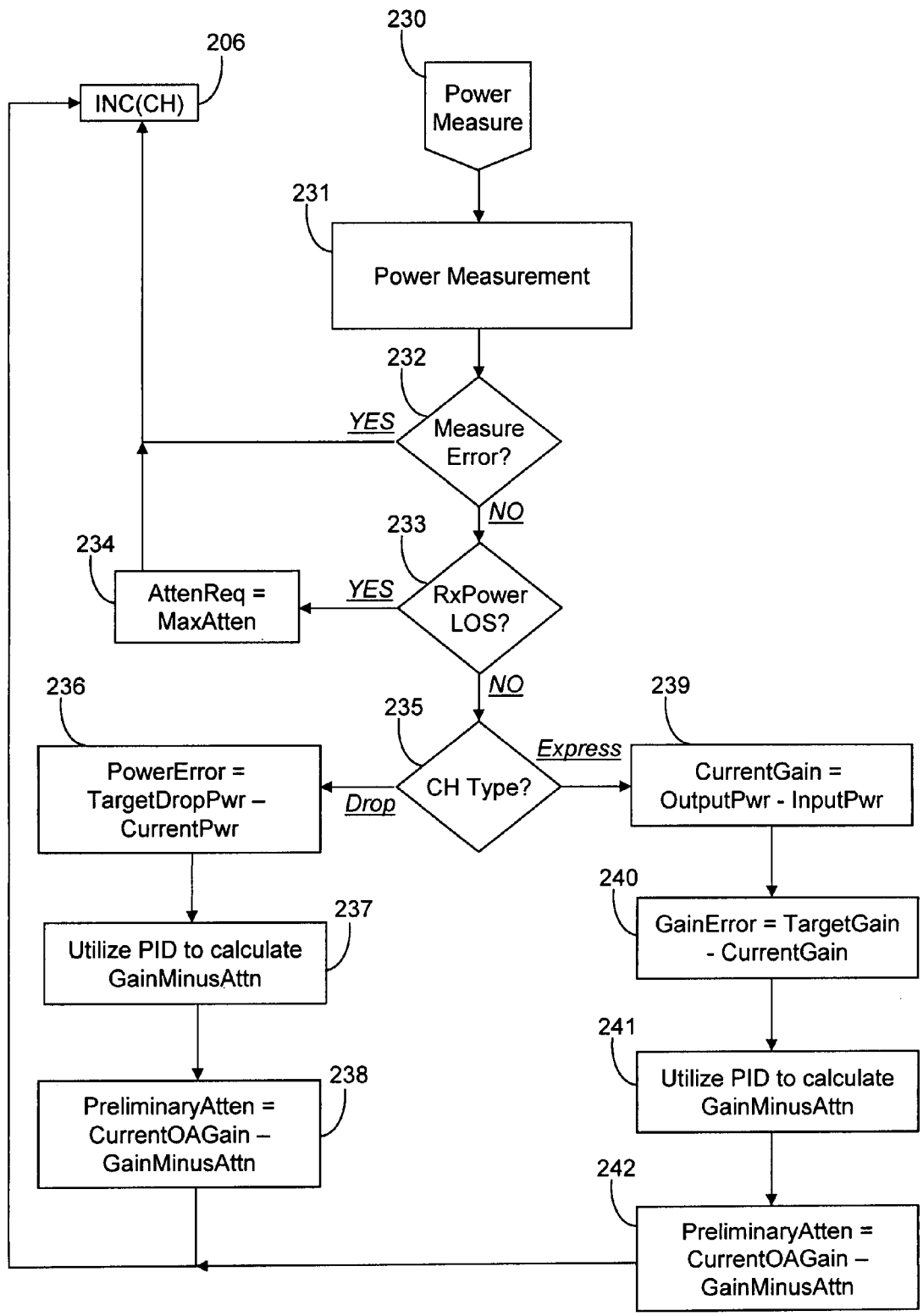
FIG. 7 is a third flowchart illustrating power measurement, error measurement, and attenuation setting portion of a constant node gain loop according to an exemplary embodiment of the present invention.

FIG. 7 illustrates the power measurement (step 230), error measurement, and attenuation setting portion of the CNG loop. The power is measured for each channel (step 231). This step is accomplished both at the channel input and output, and uses an OCM in one embodiment. Next, the CNG loop checks to see if there is a measurement error (step 232) and, if so, it returns to step 206. If no error, the CNG loops checks to see if there is a LOS on the receive power (step 233) and, if so, the attenuation setting request (AttenReq) is set to a maximum attenuation value (MaxAtten) for that channel, and the CNG loop returns to step 206. If no RX LOS, then the CNG loop checks for the channel type (step 235). The CNG loop operates on both express and drop channels at the node: for express channels, CNG is nested within and has its target set by the COP loop; for drop channels, CNG runs as a single loop controlling to the drop power target.

If the channel is Express, then the Current power gain (CurrentGain) is computed as the difference between measured output and input power (step 239). Next, a gain error (GainError) is computed for that channel as the difference between TargetGain (from the COP loop) and current gain (step 240). A PID controller utilizes this gain error to calculate GainMinusAttenuation (GainMinusAttn). The GainMinusAttn is a value distributed between the OA and attenuation of the VOA which results in the maximum gain for the best OSNR. The GainMinusAttn value will be used to calculate VOA attenuation changes through the loop, and the value is dominated by the channel which generates the maximum excess preliminary attenuation during the PID calculation. The Preliminary attenuation of the channel is set equal to the current OA gain minus the GainMinusAttn value (step 242), and the CNG loops returns to step 206.

If the channel is dropped, then the Power error is computed as the difference between a target drop power (TargetDropPwr) and the current measured or calculated channel power at the receiver (step 236). This TargetDropPwr can be a provisioned value, or set automatically from reading configuration data of the receiver requirements. It is not set by the COP loop. Next, the PID controller utilizes this gain attenuation of the channel is set equal to the current OA gain minus the GainMinusAttn value (step 238), and the CNG loops returns to step 206.

Figure 8:
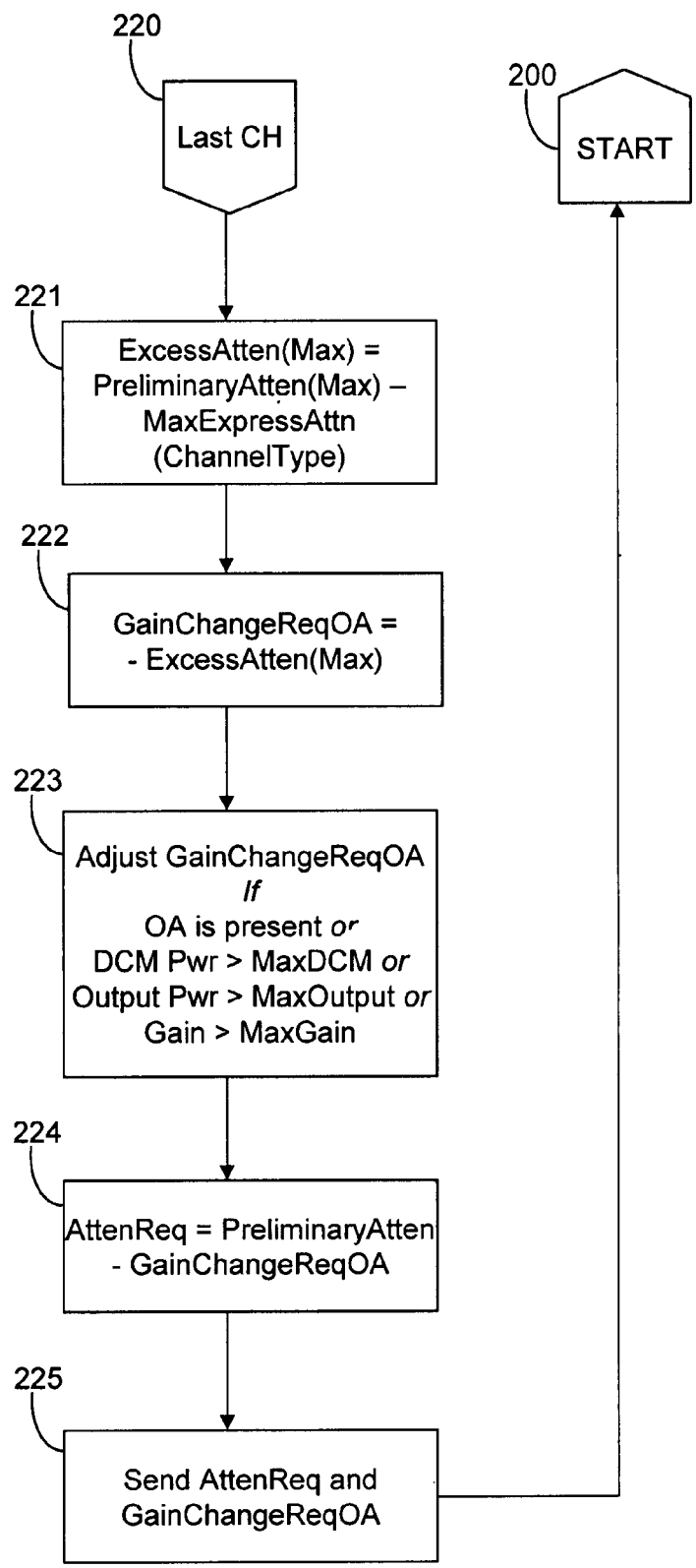
FIG. 8 is a third flowchart illustrating another portion of the constant node gain loop according to an exemplary embodiment of the present invention.

FIG. 8 illustrates the last channel steps 220 for the CNG loop. The maximum excess attenuation (ExcessAtten(Max)) is computed as the difference between the maximum preliminary attenuation (PreliminaryAtten(Max)) minus the maximum express attenuation for that channel type (MaxExpress Attn) (step 221). For example, the maximum express attenuation can be 8 dB for express channels and 15 dB for dropped channels. Next, the requested gain change for the OA (GainChangeReqOA) is calculated as minus ExcessAtten(Max) (step 222). This GainChangeReqOA may be required to be adjusted according if an OA is present, DCM power is above a maximum, output power is above a maximum, or gain is above a maximum (step 223). The attenuation request for each channels is computed as the preliminary attenuation for that channel minus the GainChangeReqOA value (step 224). Finally, the new attenuation settings and the new gain settings are sent to the various components (step 225), and the loop returns to step 200.

Figure 9:
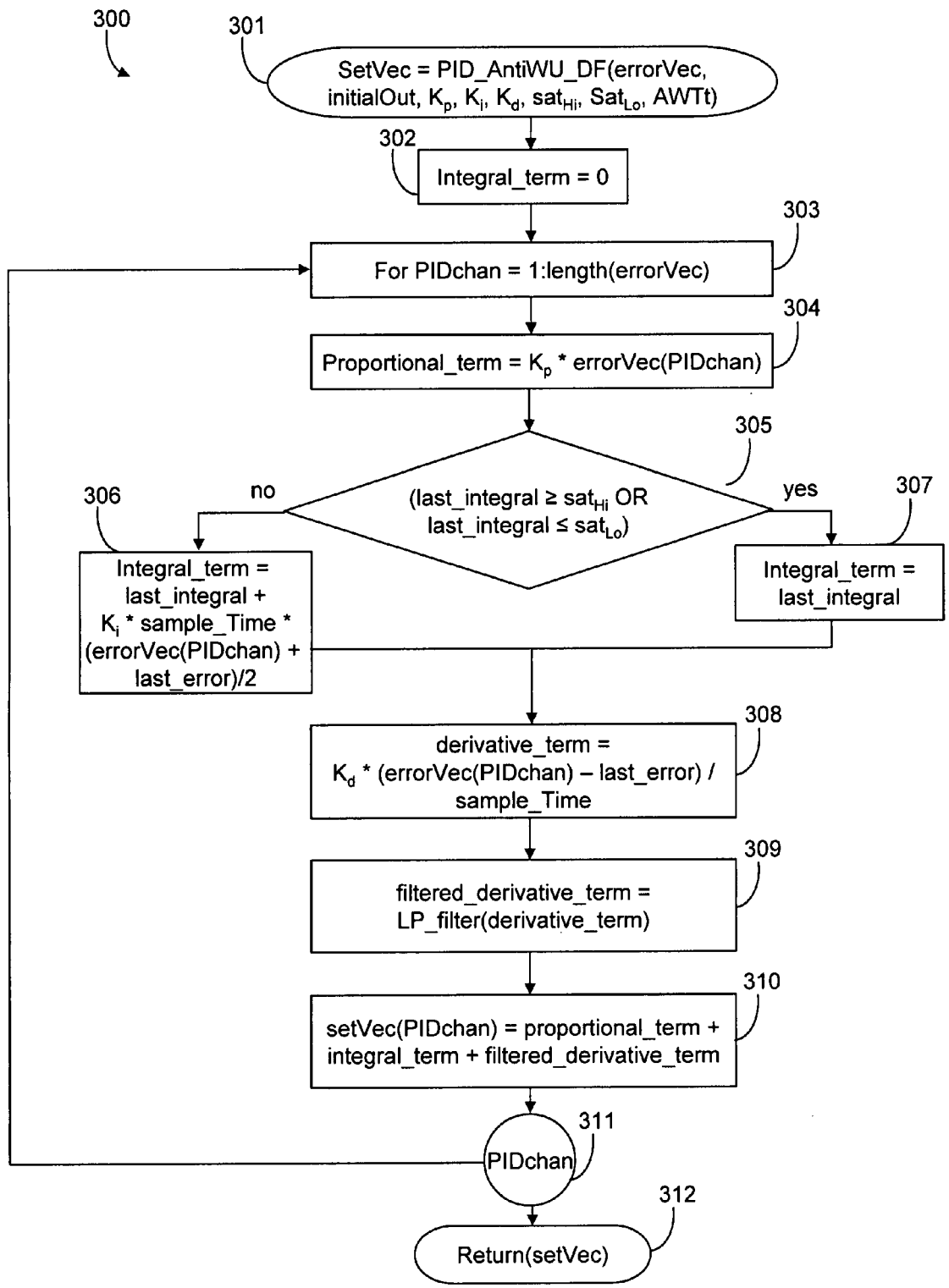
FIG. 9 is a flowchart illustrating a PID control process calculation according to an exemplary embodiment of the present invention.

Referring to FIG. 9, a flowchart 300 illustrates an exemplary embodiment of a PID control process according to the present invention. As described herein, a MIMO reconfigurable optical node can be modeled as two separate SISO systems: one for all channels to compute a node target gain (e.g. through the COP loop), and one for the attenuation of each channel to compute a gain minus attenuation value that is subsequently used to determine a new channel attenuation setting (e.g. GainMinusAttn in the CNG loop).

The automatic channel power control algorithms loops can be implemented using standard Proportional-Integral-Differential (PID) control loops with Anti-windup saturation. PID parameters ($K_p$, $K_i$, $K_d$) are chosen such that the CNG and COP loops are separated by approximately 10 times in speed, so that there is little interaction between the loops. PID parameters can be changeable by a super-user without upgrading the SW load. Optimal PID parameters can be determined first by modeling, such as with the Simulink program, and then by system measurement.

The PID control process, PID_AntiWU_DF, is provided variables including an error vector (errorVec) including an array of error values, an initial output (initialOut), the PID constants ($K_p$, $K_i$, $K_d$), saturation high and low values ($sat_{hi}$, $sat_{lo}$), and a counter, $AWT_p$ of how many times saturation was hit (step 301). For example, the array of error values can include GainMinusAttn error for each channel from the CNG loop, and power output error for each channel from the COP loop. The integral term (integral_term) of the PID process is set to 0 (step 302).

A loop is run for each value in the errorVec where PIDchan represents the array value in the errorVec for each iteration of the loop (step 303). The proportional term of the PID process (proportional_term) is set equal to the multiplication of the value at errorVec(PIDchan) times the $K_p$ constant (step 304). To prevent windup saturation, the value of the last integral is compared against the saturation constants ($sat_{hi}$, $sat_{lo}$) to ensure that it falls within the range (step 305). If not, then the integral term (integral_term) is left unchanged (step 307). If it does fall within the range, then the integral_term is set equal to the last_integral plus the $K_i$ constant times a sample time (sample_Time) times the result of the errorVec(PIDchan) plus the last_error divided by two (step 306).

The derivative term (derivative_term) is set equal to the $K_d$ constant divided by sample_Time times the result of the errorVec(PIDchan) minus the last error (step 308). The derivative_term is filtered through a LP_filter (step 309). The updated value from the PID process, setVec(PIDchan) is set equal to the proportional_term plus the integral_term plus the filtered_derivative_term (step 310). The PIDchan is incremented to the next value in the errorVec (step 311), and the loop is repeated. After the loop has gone through all the values in the errorVec, the updated errorVec is output (step 312).

Figure 10:
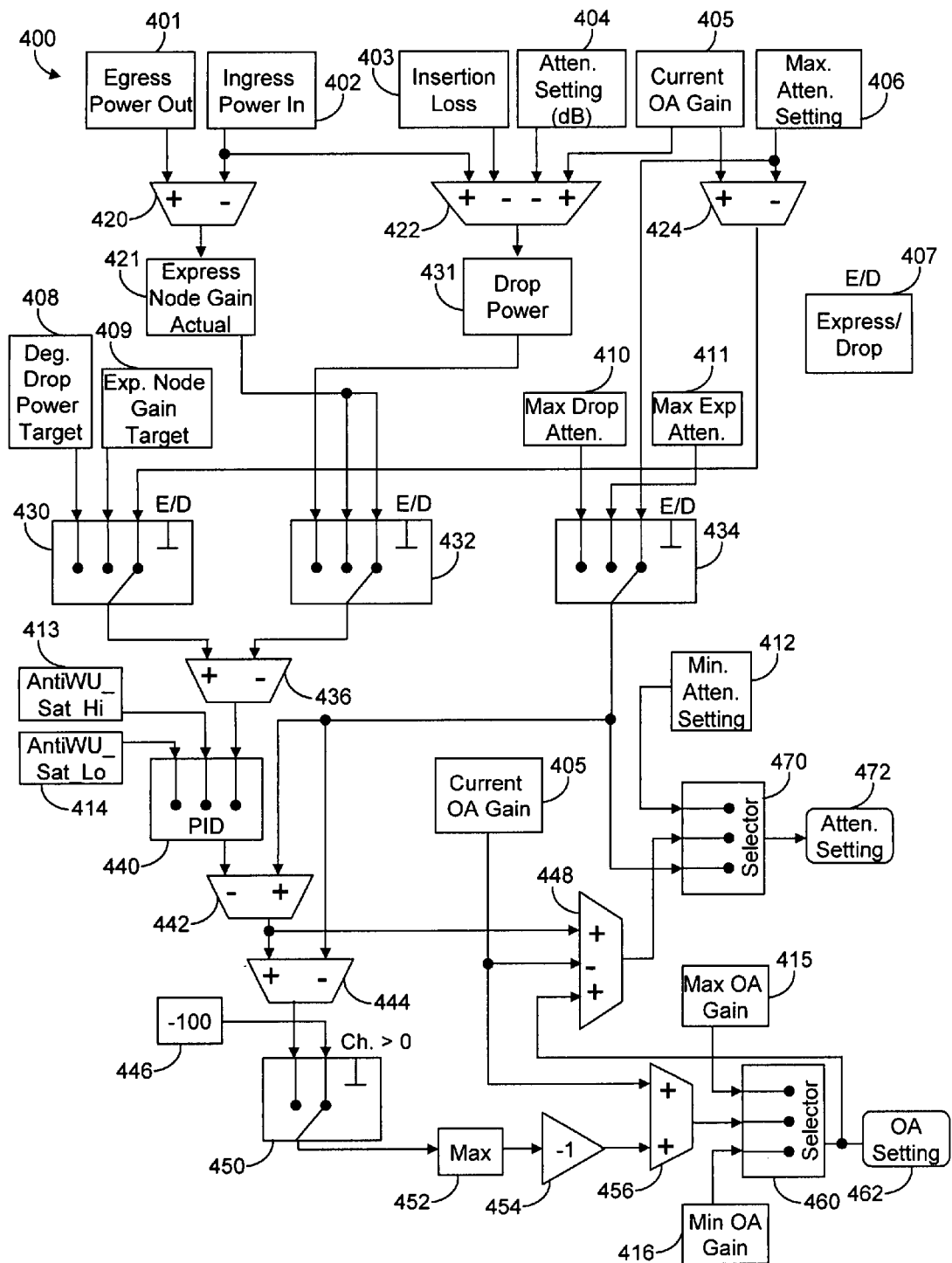
FIG. 10 is a flowchart illustrating an embodiment of a CNG control loop utilizing a PID control process according to an exemplary embodiment of the present invention.

Referring to FIG. 10, a flowchart illustrates a signal flow diagram 400 of an embodiment of a CNG control loop utilizing a PID control process according to an exemplary embodiment of the present invention. The diagram 400 includes input variables including egress power out 401, ingress power in 402, insertion loss 403, attenuation setting 404, current OA gain 405, maximum attenuation setting 406, channel type (express/drop) 407, degree drop power target 408, express node gain target 409, maximum drop attenuation 410, maximum express attenuation 411, minimum attenuation setting 412, saturation high constant value (AntiWU_Sat_Hi) 413, saturation low constant value (AntiWU_Sat_Lo) 414, maximum OA gain setting 415, and minimum OA gain setting 416.

The egress power out 401 and ingress power in 402 are vector spaces with power readings for each channel, such as received from an OCM or the like. For example, egress power out $401=(PO_1, PO_2, \ldots PO_n)$, where $PO_x$ is power out for the $x^{th}$ channel. The insertion loss 403 is a vector space with each value representing the loss between the output of the node to its endpoint (e.g. a receiver). The attenuation setting 404 is a vector space with each value representing the current attenuation for that channel. The current OA gain 405 is the current gain setting of the OA. The maximum attenuation setting 406 is a vector space representing the maximum possible setting for each channel's attenuation. The channel type (express/drop) 407 is a vector space representing the channel type for each channel either express (passes through the node) or drop.

The degree drop power target 408 and express node gain target 409 are vector spaces representing to node gain target for each channel as calculated by an outer loop (i.e. the COP loop). The maximum drop attenuation 410, maximum express attenuation 411, and minimum attenuation setting 412 are vector spaces with each value representing the maximum attenuation for drop channels, the maximum attenuation for express channels, and the minimum attenuation setting, respectively. The saturation high constant value (AntiWU_Sat_Hi) 413 and saturation low constant value (AntiWU_Sat_Lo) 414 are constants for the PID control process to ensure no windup occurs. The maximum OA gain setting 415 and minimum OA gain setting 416 are the maximum and minimum possible OA gain settings.

The egress power out 401 is subtracted from the ingress power in 402 (step 402) to calculate express node gain actual 421. The ingress power in 402 is added to the current OA gain 405 and the result is subtracted from the insertion loss 403 and attenuation setting 404 (step 422) to calculate drop power 431. A selection is made between the degree drop power target 408, express node gain target 409, and the current OA gain 405 subtracted by the maximum attenuation setting 406 (step 424) based upon whether the channel is express or drop 407 and whether there is a channel present (step 430). If the channel is express, then step 430 selects the express node gain target 409. If the channel is drop, then step 430 selects the degree drop power target 408. Finally, if no channel is present, then step 430 selects the current OA gain 405 subtracted by the maximum attenuation setting 406 from step 424.

A selection is made between the drop power 431 and the express node gain actual 421 depending on whether the channel is express or drop 407 and whether there is a channel present (step 432). If the channel is drop, then step 432 selects the drop power 431. If the channel is express or if there is no channel present, then step 432 selects the express node gain actual 421. The result of step 430 is subtracted by the result of step 432 (step 436). The result of step 436 is provided to a PID control process (step 440) along with the AntiWU_Sat_Hi 413 and AntiWU_Sat_Lo 414. Note, the result of step 436 represents the error signal of the actual between the actual power gain and the gain target.

A selection is made between the maximum drop attenuation 410, the maximum express attenuation 411, and the maximum attenuation setting 406 depending on whether the channel is express or drop and whether the channel is present (step 434). If the channel is drop, then step 434 selects the maximum drop attenuation 410. If the channel is express, then step 434 selects the maximum express attenuation 411. Finally, if no channel is present, then step 434 selects the maximum attenuation setting 406. The result of step 434 is subtracted from the PID control 440 result (step 442). The result of step 442 is subtracted from the result of step 434 (step 44). A selection is made between the result of step 442 and an arbitrary number 446, such as −100, depending on the channel count (step 450). If there are no channels present, then the arbitrary number 446 is selected, else the result of step 444 is selected. The result of step 450 is checked to find the maximum value in the vector space, and that result is selected (step 452). This is done because the OA gain setting is responsive to the channel closest to its maximum attenuation setting. The result of 452 is changed to a negative value (step 454).

The current OA gain 405 is added to the result of step 454 (step 456). A selection is made between the result of step 456, the maximum OA gain 415, and the minimum OA gain 416 (step 460). If the result of step 456 is between the maximum OA gain 415 and minimum OA gain 416, then step 460 selects the result of step 456, else the maximum gain 415 or minimum OA gain 416 is selected depending on which one the result of step 456 is closer to. A new OA setting is provided by the loop (step 462). The result of step 442 is added to the OA setting from step 462 and subtracted by the current OA gain 405 (step 448). A selection is made between the result of step 448, the result of step 434, and the minimum attenuation setting 412 (step 470). If the result of step 448 is in between the result of step 434 and the minimum attenuation setting 412, then the result of step 448 is provided from the selector 470, else the values closest to the result of step 448 is provided. The result of the selector 470 is an updated attenuation setting 472.

Figure 11:
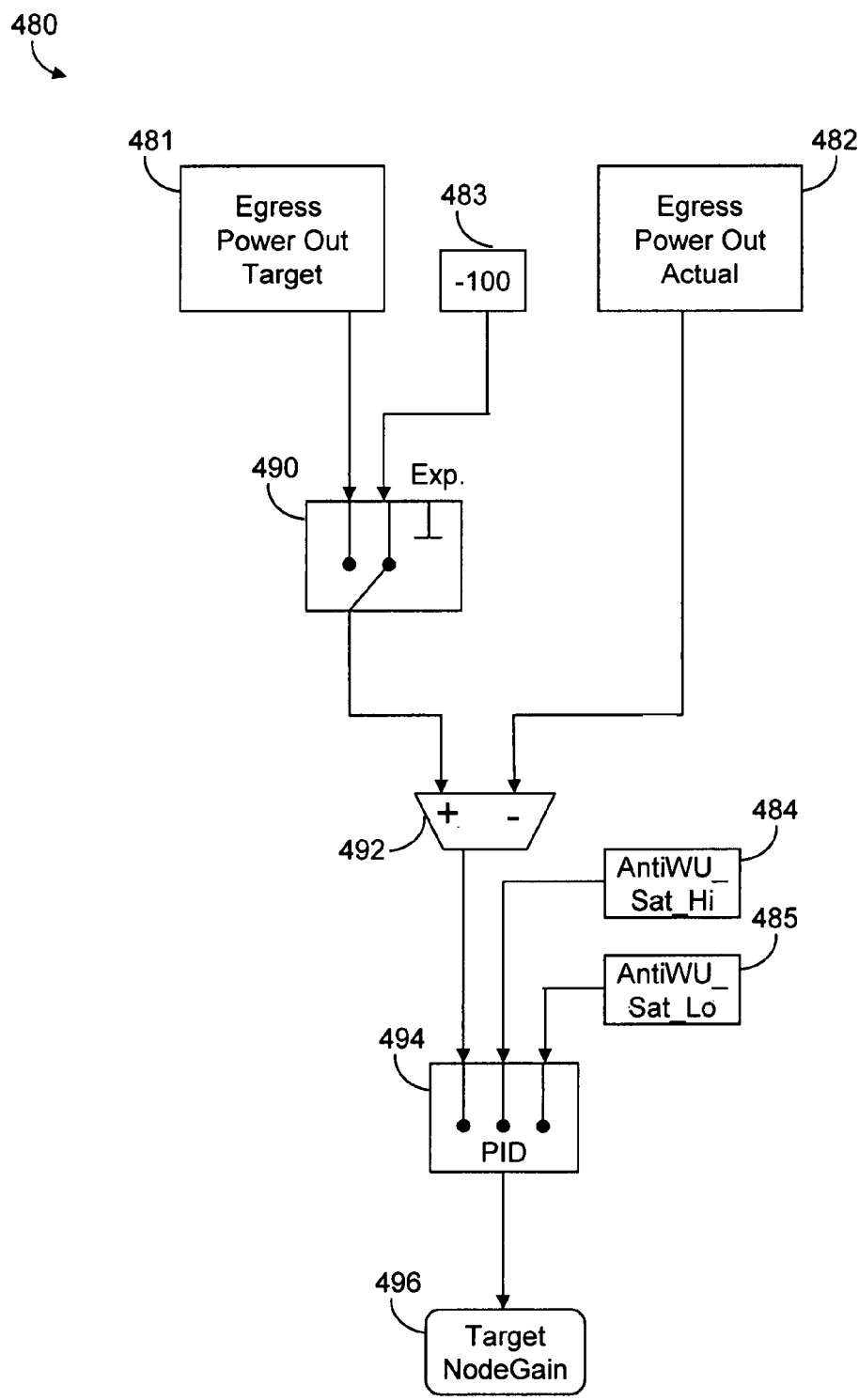
FIG. 11 is a flowchart illustrating an embodiment of a COP control loop utilizing a PID control process according to an exemplary embodiment of the present invention.

Referring to FIG. 11, a flowchart illustrates a signal flow diagram 480 of an embodiment of a COP control loop utilizing a PID control process according to an exemplary embodiment of the present invention. The diagram 480 includes input variables including an egress power out target 481, an egress power out actual 482, a saturation high constant value (AntiWU_Sat_Hi) 484, and a saturation low constant value (AntiWU_Sat_Lo) 485. As described herein, the COP control loop only operates on express channels to brings the node output power (launch power) to a target value, a target node gain 496 which in turn is used by the CNG loop.

The egress power out target 481 is a vector space of the target power output levels for each channel. The egress power out actual 482 is the measured power output level for each channel. The AntiWU_Sat_Hi 484 and AntiWU_Sat_Lo 485 are constants for the PID process to prevent wind up. A selection is made between the egress power out target 481 and an arbitrary low number 483, such as −100, depending on whether the channel is an express channel (step 490). If the channel is express, then the result of step 490 is the egress power out target 481, else it is the arbitrary low number 483. The result of step 490 is subtracted from the egress power out actual 482 (step 492). The result of step 492 represents the error between the express channel output power and the target output power, and is provided to a PID controller 494 along with the AntiWU_Sat_Hi 484 and AntiWU_Sat_Lo 485. The output of the PID controller 494 is the target node gain 496 which is provided to the CNG control loop (e.g. as express node gain target 409).

Figure 12A:
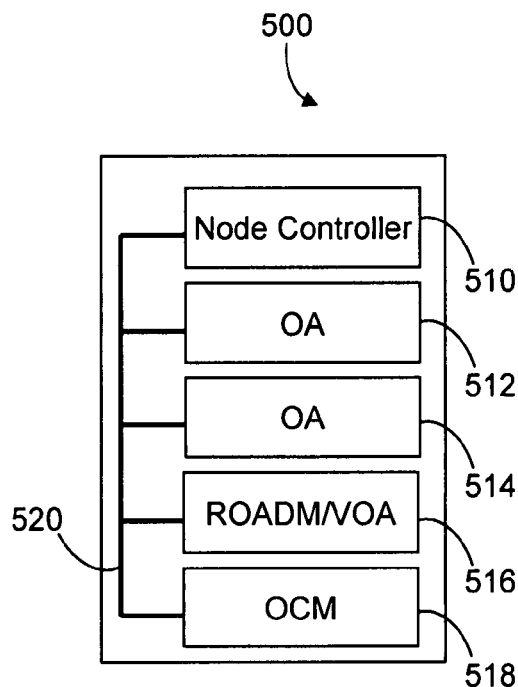
FIGS. 12*a*-12*b* are diagrams of exemplary embodiments of nodal configurations including components configured to perform the control loops of the present invention.
Figure 12B:
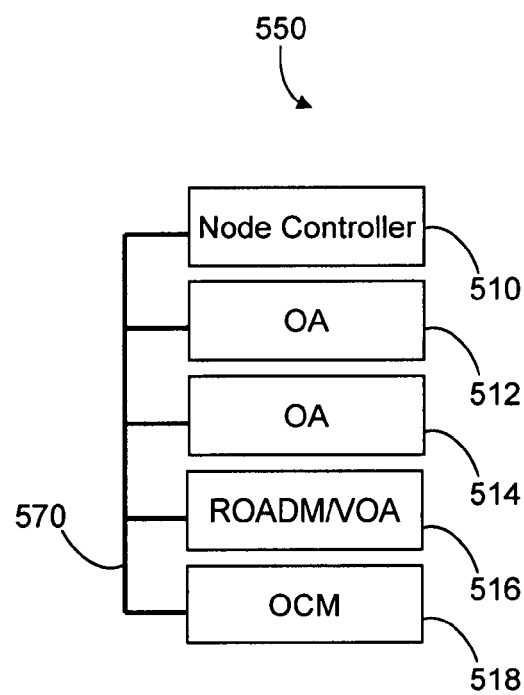

Referring to FIGS. 12a-12b, exemplary node configurations 500,550 illustrate the optical components for performing the adaptive gain control loops of the present invention. The components required to perform optical amplification, add-drop, and the control loops of the present invention generally include a node controller 510, optical amplifiers (OAs) 512,514, a ROADM/VOA 516, and an OCM 518. In node 500, the components (510,512,514,516,518) are in communication through a backplane 520. For example, in node 140 the components (510,512,514,516,518) can be individual circuit packs which are installed in a shelf which includes the backplane 520. In node 550 the components (510,512,514, 516,518) are in communication through a network connection 570, such as Ethernet. For example, in node 550 the components (510,512,514,516,518) can be stand-alone modules which communicate through the network connection 570.

The node controller 510 provides a single contact point for the node for an element management system (EMS), network management system (NMS), and the like. Additionally, the controller 510 is operable to perform nodal control functions, such as operating the nested control loops of the present invention. The OAs 512,514 are configured to provide pre- and post-amplification. Also, the nodes 500,550 can include multiple OAs 512,514 as are required for additional degrees at a ROADM node. The node controller 510 is configured to operate multiple degrees and to operate the nested control loops on these multiple degrees. The ROADM/VOA 516 is included at a mid-stage point optically between the OAs 512,514 and is configured to perform attenuation per-channel or per groups of channels. Additionally, the ROADM can provide reconfigurable add-drop of wavelengths. Finally, the OCM 518 is configured to perform optical channel monitoring on the transmit and receive side per channel as required by the nested control loops.

Figure 13:
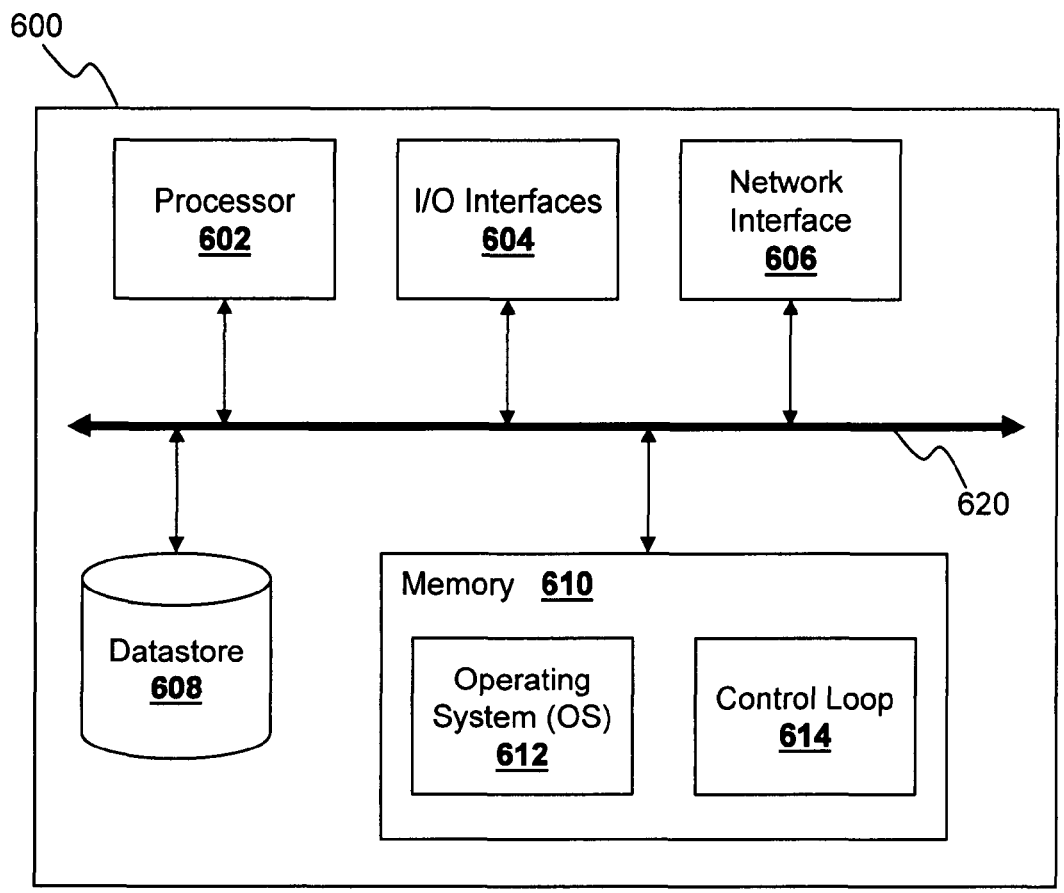
FIG. 13 is a block diagram of a controller according to an exemplary embodiment of the present invention.

Referring to FIG. 13, a block diagram illustrates a controller 600 having a control loop 614 engine, according to an exemplary embodiment of the present invention. The controller 600 can be a digital computer that generally, in terms of hardware architecture, includes a processor 602, input/output (I/O) interfaces 604, network interfaces 606, memory 610, and a data store 608. In an exemplary embodiment, the controller 600 is located in a node controller communicatively coupled to optical amplifiers, OCMs, VOAs, ROADMs, etc., to perform the control loop 614 engine. In another exemplary embodiment, the controller 600 is located on each optical component (e.g. optical amplifiers, OCMs, VOAs, ROADMs) to perform the control loop 614 engine.

The components (602,604,606,608,610) are communicatively coupled via a local interface 620. For example, the local interface 620 can be, but not limited to, one or more buses or other wired or wireless connections, as is known in the art. The local interface 620 can have additional elements, which are omitted for simplicity, such as controllers, buffers (caches), drivers, repeaters, and receivers, among many others, to enable communications. Further, the local interface 620 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 602 is configured to execute software stored within the memory 610, to communicate data to and from the memory 610, and to generally control operations of the controller 600 pursuant to the software instructions.

The I/O interfaces 604 can be used to receive user input from and/or for providing system output to one or more devices or components. User input can be provided via, for example, a keyboard and/or a mouse. System output can be provided via a display device and a printer (not shown). I/O interfaces 604 can include, for example, a serial port, a parallel port, a small computer system interface (SCSI), an infrared (IR) interface, a radio frequency (RF) interface, and/or a universal serial bus (USB) interface.

The network interfaces 608 can be used to enable the controller 600 to communicate on a network. For example, the controller 600 can utilize the network interfaces 606 to communicate to optical components (e.g. optical amplifiers, OCMs, VOAs, ROADMs). Alternatively, the network interfaces 606 can communicate to the optical components over a backplane. The network interfaces 606 can include, for example, an Ethernet card (e.g. 10BaseT, Fast Ethernet, Gigabit Ethernet) or a wireless local area network (WLAN) card (e.g. 802.11a/b/g). The network interfaces 606 can include address, control, and/or data connections to enable appropriate communications on the network.

A data store 608 can be used to store data, such as information received from NEs. The data store 608 can include any of volatile memory elements (e.g. random access memory (RAM, such as DRAM, SRAM, SDRAM, and the like)), nonvolatile memory elements (e.g. ROM, hard drive, tape, CDROM, and the like), and combinations thereof. Moreover, the data store 608 can incorporate electronic, magnetic, optical, and/or other types of storage media. In one example, the data store 608 can be located internal to the controller 600 such as, for example, an internal hard drive connected to the local interface 620 in the controller 600. Additionally, in another embodiment the data store can be located external to the controller 600 such as, for example, an external hard drive connected to the I/O interfaces 604 (e.g. SCSI or USB connection). Finally, in a third embodiment the data store may be connected to the controller 600 through a network such as, for example, a network attached file server.

The memory 610 can include any of volatile memory elements (e.g. random access memory (RAM, such as DRAM, SRAM, SDRAM, etc.)), nonvolatile memory elements (e.g. ROM, hard drive, tape, CDROM, etc.) and combinations thereof. Moreover, the memory 610 may incorporate electronic, magnetic, optical, and/or other types of storage media. Note that the memory 610 can have a distributed architecture, where various components are situated remotely from one another, but can be accessed by the processor 602.

The software in memory 610 can include one or more software programs, each of which includes an ordered listing of executable instructions for implementing logical functions. The software in the memory system 610 includes the control loop 614 engine and a suitable operating system (O/S) 612. The operating system 612 essentially controls the execution of other computer programs, such as the control loop 614 engine, and provides scheduling, input-output control, file and data management, memory management, and communication control and related services. The operating system 612 can be any of Texas Instrument's Basic Input-Output System (BIOS) (available from Texas Instruments of Dallas, Tex.), Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or any other real time operating system.

In an exemplary embodiment of the present invention, the control loop 614 engine is configured to perform the control loops and PID control processes described herein. The controller 600 is configured to communicate to multiple nodes, such as through the network interfaces 608. The controller 600 receives inputs from the OCMs, OAs, and VOA attenuation settings from devices such as ROADMs, OADMs, and the like. These inputs are used to operate the control loops to provide constant output power and a constant node gain target and PID control according to the descriptions provided herein.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for controlling optical amplifier gain and per-channel attenuation in an optical node, comprising:
   handling a multiple-input, multiple-output reconfigurable optical node as one or more single-input, single-output reconfigurable optical nodes suitable for a proportional-integral-differential control process;
   monitoring per-channel input power and per-channel output power;
   managing per-channel attenuation for each of a plurality of channels in the node responsive to the monitored per-channel input power and per-channel output power; and
   managing optical amplifier gain responsive to the managing per-channel attenuation step;
   wherein the managing per-channel attenuation step comprises:
      comparing a drop power target to actual channel drop power for each of the plurality of channels that is dropped at the node;
      comparing an express node gain target to actual express node gain for each of the plurality of channels that is expressed through the node; and
      updating per-channel attenuation for each of the plurality of channels responsive to the comparing steps.

2. The method of claim 1, wherein the multiple-input, multiple-output reconfigurable optical node comprises a reconfigurable optical add-drop multiplexer, and the per-channel attenuation is performed by a wavelength selective switch.

3. The method of claim 1, wherein the express node gain target is determined by comparing egress power out actual of each of the express channels of the plurality of channels to a target value.

4. The method of claim 3, wherein a proportional-integral-differential control process is used in the comparing step.

5. The method of claim 1, wherein a proportional-integral-differential control process is used in the comparing steps.

6. The method of claim 1, wherein managing optical amplifier gain step comprises adjusting optical amplifier gain by the difference between a channel of the plurality of channels which is closest to a maximum attenuation setting and the maximum attenuation setting.

7. An optical amplifier gain and per-channel attenuation control method, comprising:
   handling a multiple-input, multiple-output reconfigurable optical node as one or more single-input, single-output reconfigurable optical nodes suitable for a proportional-integral-differential control process;
   monitoring per-channel input power and per-channel output power;
   implementing an outer control loop on a plurality of channels expressing through the node to determine a target node gain; and
   implementing an inner control loop on all channels utilizing the target node gain on the plurality of channels expressing through the node and a drop power target on a plurality of channels dropping at the node;
   wherein the inner control loop is configured to control optical amplifier gain and per-channel attenuation for the plurality of channels expressing through the node and the plurality of channels dropping at the node responsive to the monitored per-channel input power and per-channel output power.

8. The optical amplifier gain and per-channel attenuation control method of claim 7, wherein the outer and inner loop separate the multiple-input, multiple-output reconfigurable optical node into two single-input, single-output domains comprising a per-channel attenuation domain and an optical amplifier gain domain.

9. The optical amplifier gain and per-channel attenuation control method of claim 8, wherein the outer and inner loop each utilize a proportional-integral-differential control process.

10. The optical amplifier gain and per-channel attenuation control method of claim 9, wherein the proportional-integral-differential control process is used to determine the target node gain and to determine the optical amplifier gain.

11. The optical amplifier gain and per-channel attenuation control method of claim 7, wherein the multiple-input, multiple-output reconfigurable optical node comprises a reconfigurable optical add-drop multiplexer, and the per-channel attenuation is performed by a wavelength selective switch.

12. A reconfigurable optical node, comprising:
multiple-inputs and multiple-outputs handled as one or more single-inputs and single-outputs suitable for a proportional-integral-differential control process;
an optical amplifier;
means for per-channel attenuation of a plurality of channels expressing through the node and dropping at the node;
means for per-channel power measurement of the plurality of channels expressing through the node and dropping at the node; and
a node controller in communication with the optical amplifier, per-channel attenuation means, and per-channel power measurement means, wherein the node controller is configured to:
manage the per-channel attenuation means per-channel attenuation for each of a plurality of channels in the node responsive to the measured per-channel power; and
manage the optical amplifier gain responsive to the per-channel attenuation means;
wherein the node controller manages the per-channel attenuation means by:
comparing a drop power target to actual channel drop power for each of the plurality of channels dropping at the node;
comparing an express node gain target to actual express node gain for each of the plurality of channels expressing through the node; and
updating per-channel attenuation for each of the plurality of channels responsive to the comparing steps.

13. The multiple-input, multiple-output reconfigurable optical node of claim 12, wherein the express node gain target is determined by comparing egress power out actual of each of the plurality of channels expressing through the node to a target value.

14. The multiple-input, multiple-output reconfigurable optical node of claim 12, wherein a proportional-integral-differential control process is used in the comparing steps.

15. The multiple-input, multiple-output reconfigurable optical node of claim 12, wherein a proportional-integral-differential control process is used in the comparing step.

16. The multiple-input, multiple-output reconfigurable optical node of claim 12, wherein the controller manages the optical amplifier gain by adjusting optical amplifier gain by the difference between a channel of the plurality of channels which is closest to a maximum attenuation setting and the maximum attenuation setting.

* * * * *